United States Patent
Paltoglou

(10) Patent No.: US 6,586,938 B1
(45) Date of Patent: Jul. 1, 2003

(54) METAL DETECTOR METHOD AND APPARATUS

(76) Inventor: George Paltoglou, Flat 13, 225 Beaconsfield Parade, Middle Park, Victoria 3206 (AU)

( * ) Notice: Subject to any disclaimer, the term of this patent is extended or adjusted under 35 U.S.C. 154(b) by 0 days.

(21) Appl. No.: 09/581,576
(22) PCT Filed: Dec. 17, 1998
(86) PCT No.: PCT/AU98/01041
  § 371 (c)(1),
  (2), (4) Date: Aug. 14, 2000
(87) PCT Pub. No.: WO99/31529
  PCT Pub. Date: Jun. 24, 1999

(30) Foreign Application Priority Data

Dec. 17, 1997 (AU) .............................. PP0972

(51) Int. Cl.[7] .............................................. G01V 3/08
(52) U.S. Cl. ....................................... 324/329; 324/239
(58) Field of Search ................................. 324/323, 326, 324/327, 329; 340/568; 702/57, 77, 179

(56) References Cited

U.S. PATENT DOCUMENTS

| 4,700,139 A | * | 10/1987 | Podhrasky | .................. 324/329 |
|---|---|---|---|---|
| 4,868,504 A | * | 9/1989 | Johnson | ...................... 324/329 |
| 5,414,411 A | * | 5/1995 | Lahr | ........................... 340/568 |
| 5,506,506 A | | 4/1996 | Candy | ........................ 324/329 |
| 5,537,041 A | * | 7/1996 | Candy | ........................ 324/329 |
| 5,552,705 A | * | 9/1996 | Keller | ........................ 324/239 |
| 5,767,669 A | * | 6/1998 | Hansen et al. | ......... 324/207.12 |
| 6,326,791 B1 | * | 12/2001 | Bosnar | ....................... 324/329 |
| 6,469,624 B1 | * | 10/2002 | Whan et al. | ................ 340/551 |

FOREIGN PATENT DOCUMENTS

AU   B-52364/90   10/1990

* cited by examiner

Primary Examiner—N. Le
Assistant Examiner—Walter Benson
(74) Attorney, Agent, or Firm—Edell, Shaprio & Finnan, LLC

(57) ABSTRACT

In a transient electromagnetic or pulse induction type metal detecting apparatus having a receiving coil attached to a sensor, a method and apparatus is disclosed of determining a null point comprising determining a series of post transient output values for the sensor at predetermined times; forming a summation of the output values or their negatives; and altering the predetermined times so as to minimise the summation.

11 Claims, 4 Drawing Sheets

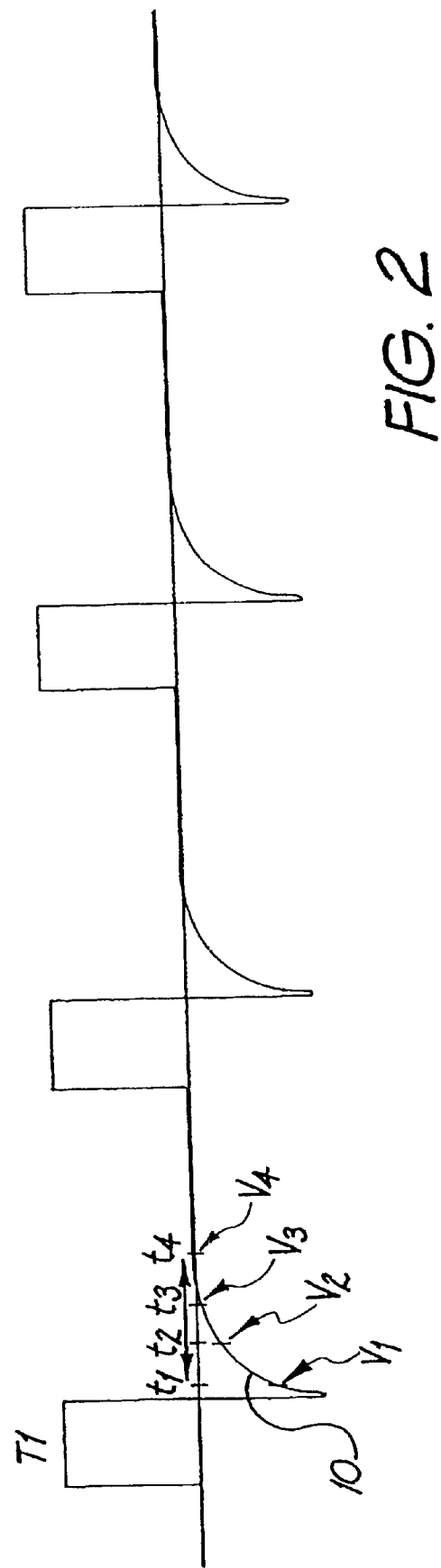

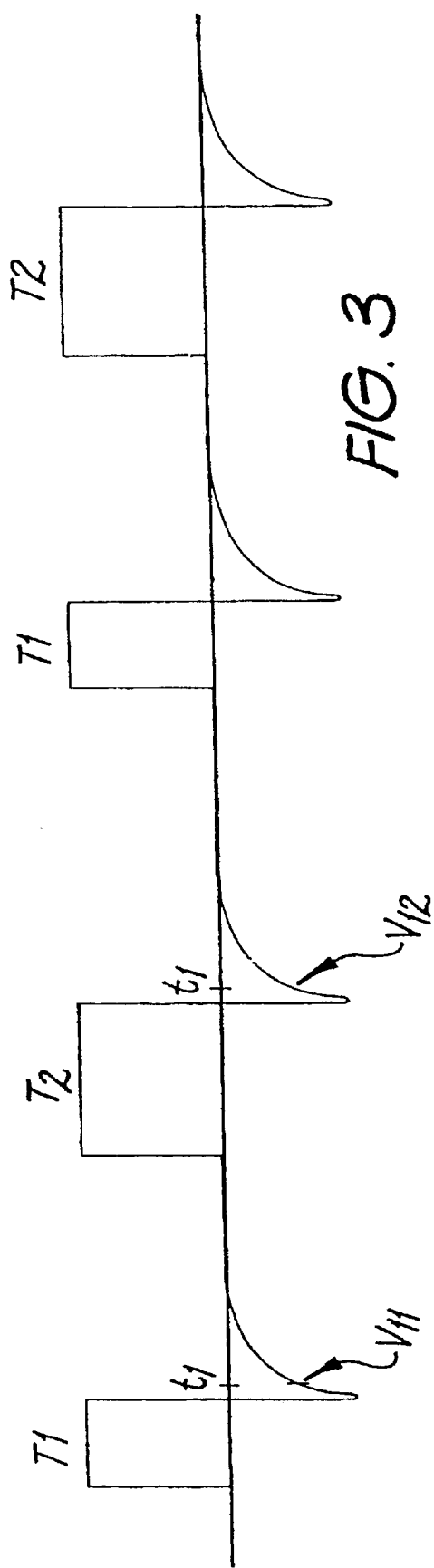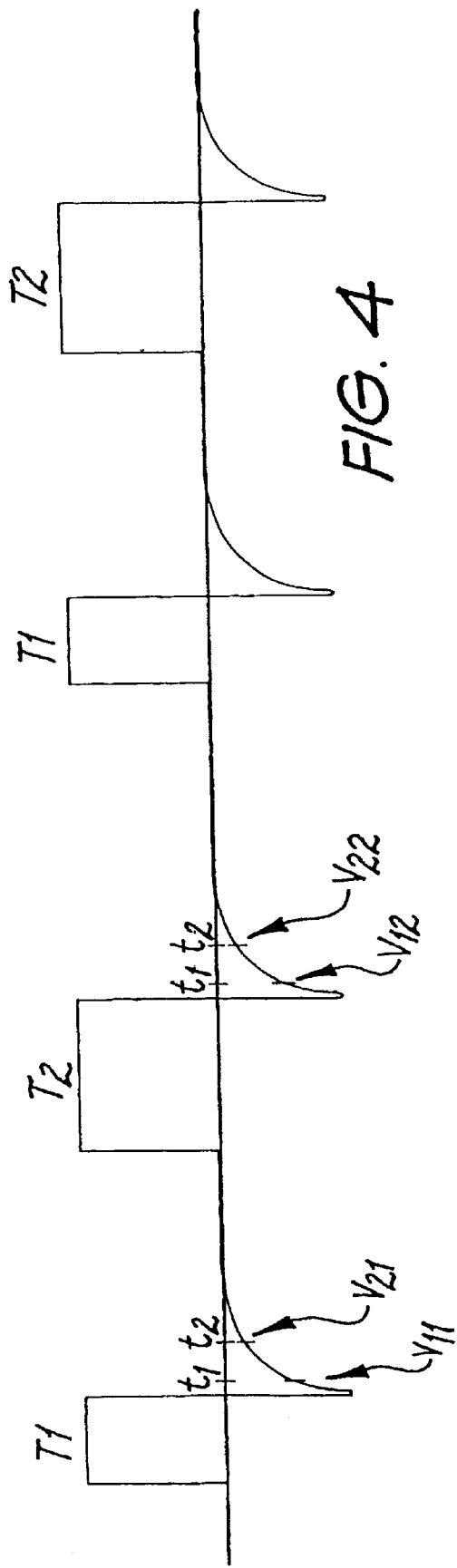

METAL DETECTOR METHOD AND APPARATUS

FIELD OF THE INVENTION

The present invention relates to the field of metal detectors and in particular, discloses improved forms of metal detectors.

BACKGROUND OF THE INVENTION

Metal detectors currently work by generating a low intensity magnetic field from a current flowing through a coil of wire (hereafter called the transmit coil) and examining the various types of distortions produced in this field by a surrounding matrix of materials. The distorted magnetic field is generally sensed by a second coil of wire (hereafter the receive coil), via the process of electromotive induction. The receive and transmit coils may also be the same physical coil of wire.

The magnetic field generated by prior known instruments is generally of two kinds (1) a sinusiodially time varying field or (2) a pulsed field. The former is generally known in the industry as a Very Low Frequency (VLF) or Transmit/Receive (TR) type, while the latter is generally known as a Transient ElectroMagnetic (TEM) or Pulse Induction (PI) type.

It is well known that a flowing current generates a magnetic field such that the field strength, B, is proportional to the current, I. Thus a voltage applied across a coil of wire will generate a magnetic field If this voltage is a time varying one, then the magnetic field is also a time varying field. Second, a voltage is generated in a coil of wire due to a change in the magnetic flux through the coil, $\epsilon = d\phi/dt$. For a coil of fixed geometry this implies $\epsilon = k*dB/dt$; where k is a constant.

Thus, in conductive materials, a changing magnetic field will induce currents. These currents are referred to as "eddy currents".

For magnetic materials this process is generally not relevant to the present application due to the high resistance of these materials. Instead, other processes are relevant. In general, when a magnetic field is applied to a material, the magnetic flux density will not be that solely due to the applied magnetic field. For diamagnetic materials, the flux density is reduced, for paramagnetic materials the flux density is increased, and for ferromagnetic materials, the flux density is increased substantially. For the purposes of this application, "Ferromagnetic" refers to the broad class of materials that include ferromagnetic, antiferromagnetic and ferrimagnetic materials. Due to the finite response time of the processes involved, the changes in flux density will not generally be in phase with the applied field, but will lag slightly. In general, the dominant effect is due to the ferromagnetic properties of materials.

In most VLF metal detectors, a sinusiodially varying magnetic field is generated. This will induce eddy currents in conductive materials and changes in the domain alignments of ferromagnetic materials. The changing magnetic field produce by these then induces a voltage in the receive coil. The resultant phase and amplitude shifts of the magnetic field generated by these processes in the surrounding matrix of materials are analysed to provide an indication of the presence of conductive or ferromagnetic materials.

For the purposes of this application, the inherent time decay of the magnetic field due to the finite inductance and capacitance of the coils can be neglected. Also, the inherent finite response time of the electronics can also be neglected. Also, the offset voltages due to the electronics and inherent coil decay time can be ignored. All these effects may be compensated for in the electronics by means of appropriate high pass filters, voltage offsets, or subtractive, techniques as is well known in the art. Furthermore, external EM influence, whether generated by natural or man-made forces, may be removed with the same techniques, as is well known in the art. It is understood that reference throughout the rest of the text to measurements of the received signal implicitly include the possible use of these techniques where appropriate.

In the simplest versions of this type of machine the decay of the voltage in the receive coil is measured at a single time after the end of the transmit pulse, generally some tens of micro seconds, and high pass filtered. The metal detector transmit and receive coils are swept over the ground and any transient signals due to the presence of conductive materials or to ferromagnetic material produces an output signal. These devices are generally limited to searches over areas that contain little or no ferromagnetic containing ground such as beach sand.

In more sophisticated TEM machines, the voltage in the receive coil is measured at two or more times after the end of the transmit pulse and the characteristic time decay of the receive signal (usually the ground) is determined, usually by computing a ratio between the signal strength at two different times, or some additive linear combination of the two voltages. This provides a method of nulling the ambient surrounding matrix of materials, usually ground containing ferromagnetic material. Any variations in the characteristic decay time (as opposed to the overall signal strength) indicates the presence of other material, such as conductive material like a coin or a gold nugget, or ferromagnetic material such as rusted iron artefacts. British patents GB 2,071,327 and GB 2,071,532 describe inventions of this type.

The user of a metal detector often encounters severe problems when using a prior art device in the field due to the presence of ferromagnetic materials that are a natural constituent of the ground. The materials produce distortions in the transmitted magnetic field that vary spatially over a small scale and in an irregular fashion. This results in a severe loss of time to the operator due to continually having to readjust the machine to null out the signal, or in attempting to locate a possible target that does not actually exist. Additionally, the sensitivity of such a machine may need to be reduced due to the inherent variation in ground response. The variable ground response acts as a type of noise.

VLF type detectors are particularly susceptible to such variations in ground response. This is a significant problem when prospecting for gold, which often occurs in areas with a high ground ferrite concentration. There is the additional problem in such searches that man made ferrite and Fe-containing objects such as nails, screws, and cans (which may or may not be rusted) can be difficult to exclude, resulting in further timewasting.

TEM metal detectors have a significant advantage in highly mineralised ground, as the relative variation of the parameter measured (decay time), is significantly less than that for the VLF type (phase shift). Thus the need to continually null the response of the ground is reduced. Attempts to reduce this further by using pulses of different length have been described in Australian patents AU-B-52364/90 and AU-A-31126/93. However, many conductive targets have characteristic decay times that are similar to that of the ground materials. Consequently, nulling out the ground may significantly reduce, the sensitivity to these conductive objects. More importantly, the device is still highly sensitive to rusted and iron containing . objects. Furthermore, this technology is susceptible to electromagnetic interference, such as that generated by electric motors This makes operation in populated areas difficult.

SUMMARY OF THE INVENTION

It is an object of the present invention to provide for improved form of method and apparatus for detecting and discriminating ferrous and non-ferrous materials embedded within a matrix of material, for example, the ground.

In accordance with a first aspect of the present invention, there is provided, in a transient electromagnetic or pulse induction type metal detecting apparatus having a receiving coil attached to a sensor, a method of determining a null point comprising determining a series of post transient output values for the sensor at predetermined times; forming a summation of the output values or their negatives; and altering the predetermined times so as to minimise the summation.

At least two of the predetermined times can be identical and preferably the summation of the coefficients of the numbers utilised in the summation is substantially zero.

In accordance with a second aspect of the present invention, there is provided, in a transient electromagnetic or pulse induction type metal detecting apparatus having a receiving coil attached to a sensor, a method of distinguishing between ferromagnetic and conductive materials comprising the steps of monitoring the decay curve of the response of a transient pulse; comparing the decay curve to an exponential decay curve or a power law decay curve to determined a best fit; and utilising the best fit as a measure of the likelihood of detection of ferromagnetic or conductive materials by the apparatus.

In accordance with a further aspect of the present invention, there is provided, in a transient electromagnetic or pulse induction type metal detecting apparatus having a receiving coil attached to a sensor, a method of distinguishing between ferromagnetic and conductive materials comprising the steps of utilising a series of variable length transient pulses; monitoring the decay curve of the response to each of the transient pulses; comparing the decay curve of different length transient pulses; and utilising the comparison as an indicator of the type of material detected by the apparatus.

In accordance with a further aspect of the present invention, there is provided an apparatus for detecting a metal or mineral object in a surrounding medium with a reduced sensitivity to external electromagnetic interference comprising: a transmission search coil for transmitting a magnetic field; a transmission apparatus for energising the transmission search coil with a substantially rectangular voltage producing a pulsed waveform; a receive coil for detecting the changes in the surrounding magnetic field through a voltage induced across the receive coil by changes in the magnetic flux; a measuring means for measuring the voltage across the receive coil at 3 or more selected time intervals after the end of a transmission pulse; and a processing means for processing the voltages and altering the timing intervals such that a null summation is produced for a target medium.

The null summation can be produced by altering the measurement time intervals and linearly combining the voltages across the receive coil at the time intervals such that the coefficients sum to zero, and producing a ground balanced null signal substantially satisfying the following equations $0=\Sigma k_i V_i$; $\Sigma k_i=0$ where $V_i$ is the voltage at the ith time interval after the end of the transmission pulse and $k_i$ is a multiplicative factor.

The null summation can be produced by comparing the measured received voltages at given sample intervals to a power law and to an exponential law.

In accordance with a further aspect of the present invention, there is provided an apparatus for detecting a metal or mineral object in a surrounding medium comprising: a transmission search coil for transmitting a magnetic field; a transmission apparatus for energising the transmission search coil with a substantially rectangular voltage waveform producing a pulsed waveform that has pulses of two different, alternating, widths; a receive coil for detecting the changes in the surrounding magnetic field through a voltage induced across the coil by changes in the magnetic flux a measuring means for measuring the, voltage across the receive coil at a selected time interval after the end of a transmission pulse, the time interval being alterable; a processing means of processing the the voltages, and altering the transmission pulse width, and altering the receive timing interval such that a null summation is produced for a target medium.

The null summation can be produced by linearly combining the receive voltages determined after each pulse such that a ground balance null can be substantially achieved according to the equation $0=V_{11}+kV_{12}$ where $V_{11}$ is the voltage measured after the short transmission pulse and $V_{12}$ is the voltage measured after the long transmission pulse, and k is a multiplicative factor.

In accordance with a further aspect of the present invention, there is provided an apparatus for detecting a metal or mineral object in a surrounding medium with reduced sensitivity to ferromagnetic materials comprising: a transmission search coil for transmitting a magnetic field; a transmission apparatus for energising the transmission search coil with a substantially rectangular voltage waveform producing a pulsed waveform that has pulses of two different, alternating, widths; a receive coil for detecting the changes in the surrounding magnetic field through a voltage induced across the receive coil by changes in the magnetic flux; measuring means for measuring the voltage across the receive coil at two selected time intervals after the end of a transmission pulse, the time intervals being alterable; processing means for processing the voltages, altering the transmission pulse width, and altering the receive timing interval such that a null summation is substantially produced for a target medium.

The null summation can be achieved by linearly combining the receive voltages derived from the short and long transmission pulses satisfying the following equation to produce a ground balanced null: $0=\Sigma_{ij} k_{ij} V_{ij}$ where $V_{i1}$ is the ith measurement interval after the end of the shorter transmission pulse, where $V_{i2}$ is the ith measurement interval after the end of the longer transmission pulse, and $k_{ij}$ is a multiplicative factor.

In accordance with a further aspect of the present invention, there is provided an apparatus for detecting a metal or mineral object in a surrounding medium with reduced sensitivity to ferromagnetic materials comprising: a transmission coil for transmitting a magnetic field; a transmission apparatus for energising the search coil with a substantially rectangular voltage producing a pulsed waveform that has pulses of at least three different, alternating, widths; a receive coil for detecting the changes in the surrounding magnetic field through a voltage induced across the receive coil by changes in the magnetic flux; measurement means for measuring the voltage across the receive coil at two selected time intervals after the end of a transmission pulse, the time intervals being alterable; and processing means for processing the voltages, altering the transmission pulse width, and altering the receive timing interval such that a null summation is produced for a target medium.

The null summation can be achieved by combining the voltages derived after each different transmission pulse width such that a ratio of values derived from the receive voltages due to any two of the transmission pulse width types are preferably used to compute expected receive voltages due to the third transmission pulse type and are preferably compared with measured voltages.

The null summation can be achieved as follows—given $t_i$ is the ith time interval after the transmission pulse, $V_{ij}$ is the ith measured voltage (at time interval $t_i$) after the jth transmission pulse type, calculating:

$$V_{11}/V_{21}=(t_1/t_2)^{-\alpha 1}$$

$$V_{12}/V_{22}=(t_1/t_2)^{\alpha 2}$$

and $\alpha_i$ is the spectral index for transmission pulse type i, which depends on the material being interrogated, the null summation, having little sensitivity to ferromagnetic materials being formed as follows:

$$0=V_{13}+(t_1/t_2)^{-\alpha 3}V_{23}$$

BRIEF DESCRIPTION OF THE DRAWINGS

Notwithstanding any other forms which may fall within the scope of the present invention, preferred forms of the invention will now be described, by way of example only, with reference to the accompanying drawings in which:

FIGS. 2–5 are timing diagrams illustrating sampling regimes of alternative embodiments of the present invention.

Figure 1:
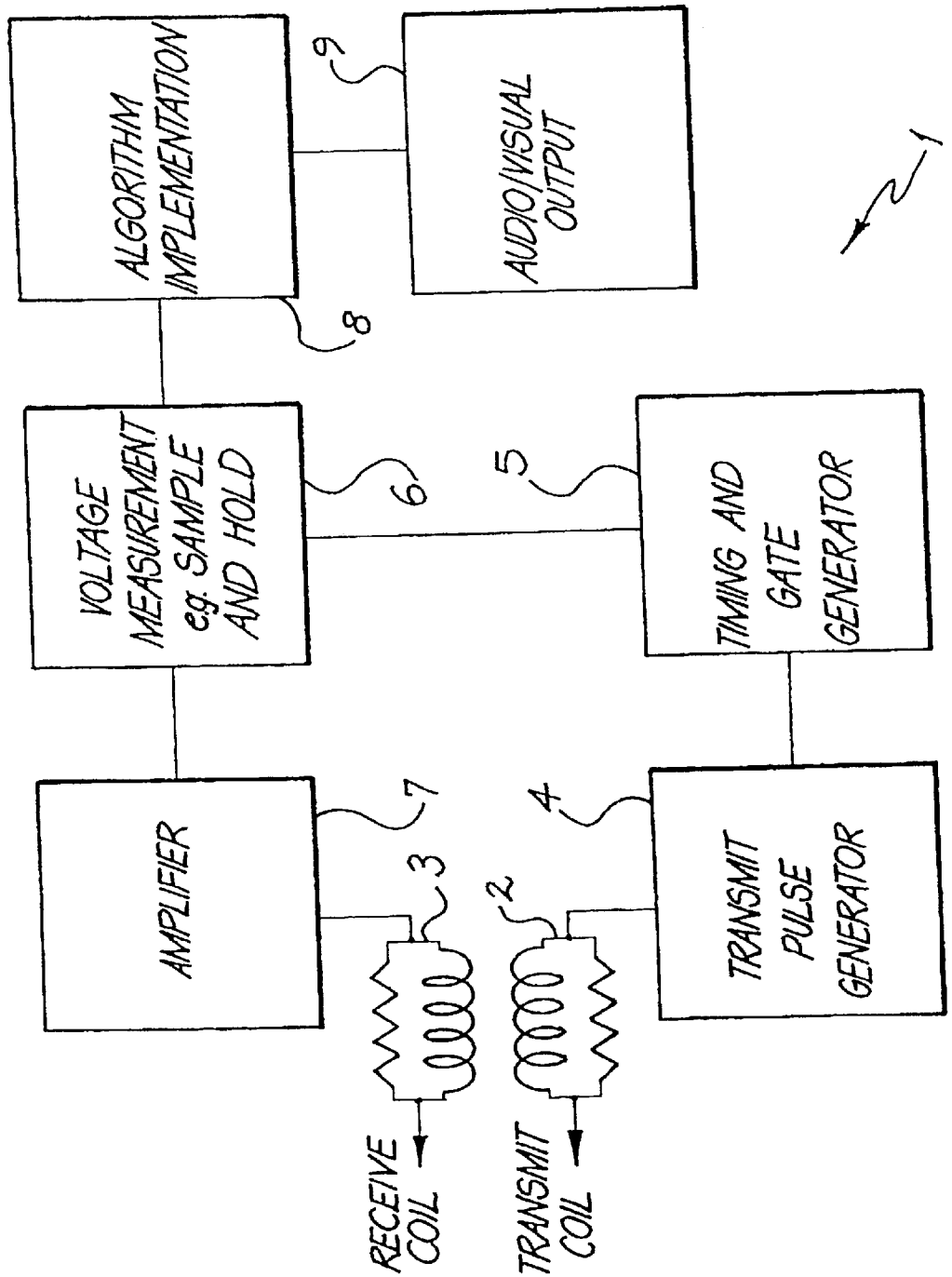
FIG. 1 is a schematic block diagram of one form of implementation of the preferred embodiment.

In these diagrams the pulses are shown as positive, but may be negative without loss of generality, and may also be of alternate polarity. The negative voltage spike at the end of each transmit pulse is due to the coil inductance. In these diagrams they have been clipped both for clarity and because within the circuit electronics itself they will be clipped by the limits of the supply voltage.

DESCRIPTION OF PREFERRED AND OTHER EMBODIMENTS

The preferred embodiments of the present invention pertains to a TEM-type metal detector and addresses the problem of reduced sensitivity to some conductive materials, the discrimination of ferrous materials, ground signal elimination and to the problems of use in areas of electromagnetic interference. In order to explain the preferred embodiments, some further properties of materials in response to pulsed magnetic fields need to be elucidated. The following properties have been determined from experiments by the inventor on a large variety of conductive and ferromagnetic materials:

(a) the observed decay of voltage induced in a receive coil from a conductive target subjected to a pulsed magnetic field is given by an exponential law:

$$V=K\exp(-t/\tau),$$

where t is the time since the end of the transmit pulse, and τ is a characteristic decay time dependent on (but not exclusively upon) the characteristic scale, shape and resistivity of the object, and K is a multiplicative constant. This relationship is well known in the literature and is obvious from basic physics principles. τ is in the range 5 to 100 microseconds for objects generally of interest to metal detector operators. For conductive objects the characteristic decay time is constant irrespective of transmit pulse width. Thus the response of a conductive object may be considered as due to a resistor and inductor in parallel. Irregularly shaped objects may respond as a network of parallel resistors/inductors, where the response may be approximated by $$V=\Sigma_i k_i \exp(-t/\tau_i)$$

(b) the observed decay of a voltage induced in the receive coil from a non-conductive ferromagnetic target is given by a power law $$V=Kt^{-\alpha},$$

where t and K are as above, and 'α' is the spectral index, thought to be dependent on (but not exclusively on) the chemical composition, crystal structure, temperature, characteristic object size, characteristic object shape and transmit pulse width. From experiments by the inventor it has been established that α is generally in the range 1.3 to 2.5 for objects and materials of interest to metal detector operators. It is worth noting these results are not in agreement with previous suggestions in the art that α=1.

In particular, it has been established for all ground types examined, including lateritic and mafic soils, and for essentially non-conductive rusted and Fe-containing objects, that, for transmit pulse widths ($T_{pw}$) greater that 1000 μs, 'α' is constant to within a few percent, but that for a $T_{pw}$ between 10 and 1000 μs, α increases non-linearly as $T_{pw}$ decreases.

Additionally, it has been determined that for most ferromagnetic materials, and in particular for all soils examined, where experimentally 1.35<α ($T_{pw}$=500 msec)<2.1, the following relationship holds $$\alpha(T_{pw}=t_1)/\alpha(T_{pw}=t_2)=k, \qquad (\text{Equ 1})$$

where $t_1<t_2$, and k>1 is a constant within experimental error.

For example, for most ferromagnetic materials examined it is found that, $$\alpha(T_{pw}=60\ \mu s)/\alpha(T_{pw}=500\ \mu s)\sim 1.4$$

and $$\alpha(T_{pw}=130\ \mu s)/\alpha(T_{pw}=500\ \mu s)\sim 1.2$$

A further relationship was found to apply ferromagnetic materials examined $$\alpha(T_{pw}=t_1)\alpha(T_{pw}=t_2)=K^*\alpha(T_{pw}=t_2)/\alpha(T_{pw}=t_3), \qquad (\text{Equ 2})$$

where $t_1<t_2<t_3$ and K(>0) is a constant within experimental error and is independent of the material examined, but dependent on $t_1$, $t_2$ and $t_3$.

Turning initially to FIG. 1, there is illustrated one form of apparatus 1 suitable for use with the preferred embodiment. The apparatus 1 includes transmission coil 2 and receive coil 3 which can be entirely standard or comprise multiple interconnected coils of various geometries. The transmission coil 2 is interconnected with a transmit pulse generator 4 which can generate a variable length pulse in accordance with signals received from a timing and gate generator 5. The timing and gate generator 5 is responsible for also signalling the sampling time for a voltage measurement unit 6. The received signal from receiving coil 3 is first amplified by amplifier 7 before being forwarded to the voltage measurement unit 6 which can comprise a sample and hold unit. The voltage measurement unit 6 is interconnected to an algorithm implementation unit 8 which displays its output on an audio visual output unit 9. It will be readily evident to those skilled in the art that the units 4–8 can be implemented on a plug in DSP board having suitable on board D-A and A-D capabilities the plug in board being inserted in a PC type computer with the usual standard operating systems etc. or, the invention can comprise a DSP or microprocessor and ADC/DAC system and appropriate pulse generators with algorithms stored in onboard memory and implemented digitally, or the instrument may be under microprocessor control, with the algorithms implemented in an analogue form, or the system may be essentially entirely in analogue form.

In the preferred embodiment, the above equations are utilised to advantage in the algorithm implementation unit 8.

A first improvement relates to TEM metal detectors that use transmit pulses of constant width and a second improvement relates to TEM metal detectors that use transmit pulses of variable width.

An Embodiment Directed to Improvements in the Elimination of Electromagnetic Interference As discussed previously, a typical method to remove the ground signal is to determine the characteristic decay time by comparing the voltage level at two points $t_1$, $t_2$ after the transmit pulse. When these are linearly combined appropriately the effect is to null the ground signal. This has the disadvantage of increasing the effects of external EM interference as the multiplicative constant is typically not equal to 1. Thus that portion of $V_1$ and $V_2$ that are due to extraneous interference are not cancelled. This problem has been partially addressed in the prior art by taking a voltage measurement $V_3$ at a time $t_3$ significantly later than $t_1$ and $t_2$ such that the signal from the target object has significantly decayed away. $V_3$ is then subtracted from $V_1$ and $V_2$ so that EM interference is reduced.

Interference can be more effectively cancelled utilising a different technique discussed with reference to FIG. 2 which shows a series of pulses of period T1 and a corresponding response curve eg. 10. The voltage of the receive signal is measured at 4 points, $t_1$, $t_2$, $t_3$ and $t_4$ after the transmit pulse giving 4 values $V_1$, $V_2$, $V_3$ and $V_4$. These are then combined as follows $$\text{output signal} = V_1 - V_2 - V_3 + V_4$$

By choosing $t_1$, $t_2$, $t_3$ and $t_4$ appropriately and such that $t_1 < t_2 < t_3 < t_4$, and altering one or more of $t_1$, $t_2$, $t_3$, and $t_4$, a null may be achieved under differing ground conditions, that is for different values of $\alpha$. The simplest method is to leave $t_1$ and $t_4$ fixed, with either or both of $t_2$ and $t_3$ variable to obtain a signal null for the given surrounding matrix of material. Note that $t_2$ and $t_3$ can be the same so that the above equation becomes $$\text{output signal} = V_1 - (2 * V_2) + V_4$$

As there are no non-unity multiplicative factors, extraneous interference cancels more effectively.

This technique may be generalised to a sum of any number of voltage measurements $V_i$, with $t_i$ chosen such that the output signal for ground is a null $$\text{output signal} = \Sigma k_i V_i; \ \Sigma k_i = 0, \ k_i = +/-1$$

A null can be achieved by varying any or all of $t_i$.

An Embodiment Directed to Improvements in Minimising Sensitivity to Ferromagnetic Materials As outlined previously the decay curve due to ferromagnetic materials can be closely approximated by a power law while for conductive materials an exponential model is more appropriate. This provides a method to distinguish between ferromagnetic and conductive materials. This may be achieved by comparing the goodness of fit of the observed decay curve, measured at three or more points after the transmit pulse, to a power law and exponential curve. A simple method utilising this technique is to determine the deviation from a best fit power law to voltage measurements take at three or more time points. This provides automatic ground nulling, and significant freedom of output signal from admixtures of ferromagnetic materials. Alternatively, $\alpha$ for a representative area of ground can be calculated from voltage measurements take at three or more time points. Then any deviations from this can be used to identify the presence of other ferromagnetic materials or the presence of conductive materials.

An Embodiment Directed to Improvements in Minimising Sensitivity to Ferromagnetic Materials Using Variable Transmit Pulse Widths In these embodiments, the transmit pulses are of alternately short and long duration, and that $T_{pw}$ for the long pulse may be >500 μs and the $T_{pw}$ for the short pulse is significantly less than $T_{pw}$ for the long pulse, providing for as large a value of k as possible in equation (1). For three different pulse widths, $T_{pw}$ is such that K is as large as feasible in equation (2).

In previous TEM type metal detectors, nulling the ground signal reduces significantly any target signal if the characteristic decay time $\tau$ is similar to the characteristic decay time of the ground. This is typically the case for objects that have $\tau \sim 50$ μs which includes a large number of conductive objects of interest to metal detector operators. In addition, the metal detector is still highly responsive to changes in the characteristic decay time of the ground requiring continual adjustment by the operator, and remains highly responsive to ferromagnetic materials in general.

Equations (1) and (2) above suggest a means whereby it is possible to null the ground response by comparing the decay times from alternating short/long transmit pulses, or the decay time scales for 3 or more transmit pulses of different width, without significantly reducing the signal from conductive objects. For example this may take the form of linear multiplicative relationship between the signals determined at one time shortly after the end of the transmit pulse, or one may attempt to determine the value of '$\alpha$' and derive a response due solely to the conductive target. Also suggested is a means whereby the response due to most ferromagnetic materials may be nulled out automatically without significantly reducing the response due to conductive materials. A number of embodiments shall now be described.

First Alternative Embodiment

Pulses of alternate short and long duration ($T_1$ and $T_2$ respectively) are transmitted as depicted in FIG. 3. The voltage across the receive coil is measured at a time $t_1$ after the end of each pulse $t_1$ is generally of the order of a few µs. The voltage measured after the short pulse is denoted $V_{11}$ while that for the long pulse is denoted $V_{12}$. The ratio of these two values will then be dependent on the surrounding material. These voltages may be linearly combined to produce a null $$0 = V_{11} + kV_{12}$$

Any changes in the type of surrounding material will change this ratio, and unbalance the null resulting in a signal that indicates of the presence different material.

Second Alternative Embodiment

A further alternative embodiment will now be described with reference to FIG. 4 of the accompanying drawings. Pulses of alternate short and long duration ($T_1$ and $T_2$ respectively) are transmitted. The voltage across the receive coil is measured at two times ($t_1$ and $t_2$, generally of the order of a few µs to a few hundred µs, and where $t_1 < t_2$) after the end of each pulse. The voltages measured after the short pulse are denoted $V_{11}$, and $V_{21}$ while that for the long pulse are $V_{12}$ and $V_{22}$. These voltages may be linearly combined to produce a null. Eg.

$$\Sigma_{i,j=1,2} k_{ij} V_{ij}$$

The multiplicative constants, $k_{ij}$, depend on the surrounding medium. Changes to this material will unbalance the null resulting in a signal that indicates its presence. Given that most ferromagnetic materials tested have similar values of k in equation (1) this implies that these materials will not significantly unbalance the above null. This means that this embodiment remains sensitive to conductive materials but has reduced sensitivity to ferromagnetic materials.

Third Alternative Embodiment

Figure 5:
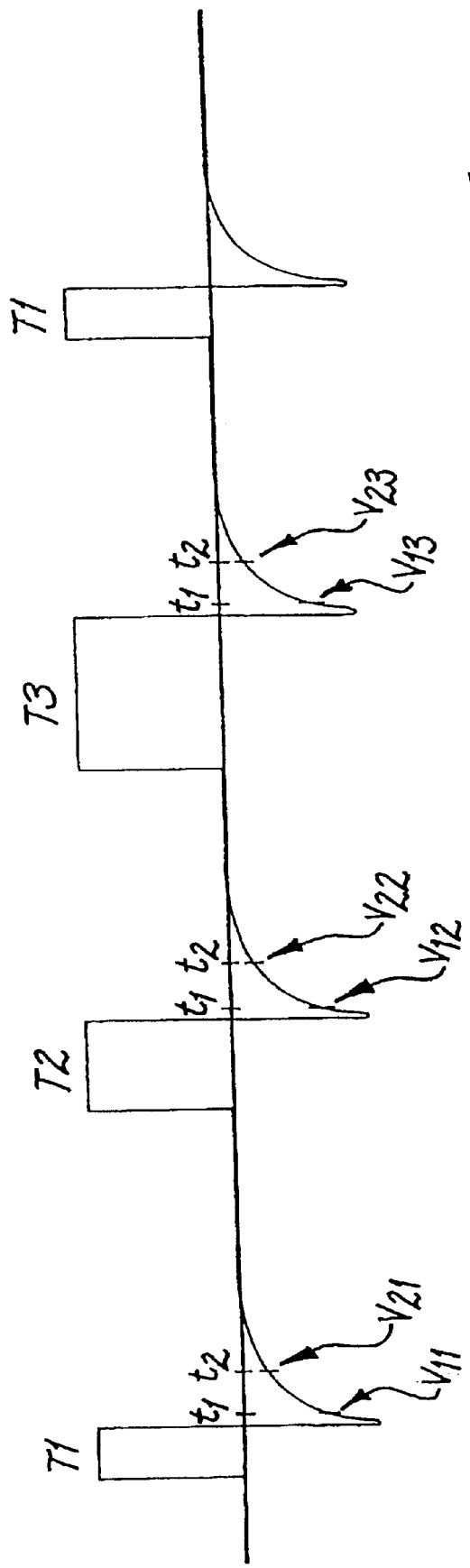

A further alternative embodiment will now be described with reference to FIG. 5 of the accompanying drawings. Pulses of three alternate lengths, $T_1$, $T_2$, $T_3$, such that $T_1 < T_2 < T_3$, are transmitted. The voltage across the receiving coil is measured at two times ($t_1$ and $t_2$, generally of the order of a few µs to a few hundred is and where $t_1 < t_2$) after the end of each pulse. The voltages measured after the short pulse are denoted $V_{11}$ and $V_{21}$, that for the mid pulse are denoted $V_{12}$ and $V_{22}$, while that for the long pulse are denoted $V_{13}$ and $V_{23}$. Using these values it is possible to combine them linearly such that sensitivity to ferromagnetic materials and any varying combination of ferromagnetic material is essentially eliminated. One can obtain a null by combining the values as follows First, $V_{12}/V_{22} = (t_1/t_2)^{-\alpha 2}$ and, $V_{11}/V_{21} = (t_1/t_2)^{-\alpha 1}$ where $\alpha_i$ is the spectral index for the decay curve due to the transmit pulse $T_i$ Then $\alpha 1/\alpha 2 = \log(V_{11}/V_{21})/\log(V_{12}/V_{22})$ and $\alpha 2 = (\log(V_{12}/V_{22})/\log(t_1/t_2)$ Then by equation (2) above we have $$\alpha 3 = K^* \alpha 2^* \alpha 2/\alpha 1$$

this implies $$\alpha 3 = K^* (\log(V_{12}/V_{22})/\log(t_1/t_2))^* \log(V_{12}/V_{22})/\log(V_{11}/V_{21}))$$

where K is determined by experiment and is a constant for all ferromagnetic materials with $\alpha 3$ computed as above a null is then achieved by combining $V_{13}$ and $V_{23}$ to achieve.

$$V_{13} + (t_1/t_2)^{-\alpha 3} V_{23}$$

By this means the user is not required to do any manual adjustment due to changing ground conditions, and the response to any ferromagnetic material is minimised. Of course, this may be extended to alternate pulses of 4 or more different widths, combined in a manner to eliminate the signal from ferromagnetic materials.

Alternatively, the signal from conductive material may be excluded in a manner similar to above, making the embodiment sensitive only to ferromagnetic materials.

This technique may also be combined with that outlined previously where a comparison of the fit for short and long transmit pulses may provide discrimination between ferromagnetic and conductive targets and an indication of the characteristic decay timescales of conductive materials embedded in the ground.

It is also possible to utilise any of the above methods in alternative embodiments such as for use in industrial, conveyor belt, food processing, and landmine metal detection.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. In a transient electromagnetic or pulse induction type metal detecting apparatus having a receiving coil attached to a sensor, a method of distinguishing between ferromagnetic and conductive materials comprising the steps of:
   monitoring the decay curve of the response of a transient pulse;
   generating a best fit of the decay curve using a function that has exponential and power law components; and
   utilising said best fit or deviations from said curve as a measure of the likelihood of detection of ferromagnetic or conductive materials by said apparatus.

2. In a transient electromagnetic or pulse induction type metal detecting apparatus having a receiving coil attached to a sensor, a method of distinguishing between ferromagnetic and conductive materials comprising the steps of:
   utilising a series of transient pulses of different length;
   monitoring the decay curve of the response to each of said transient pulses;
   comparing the decay curve of different length transient pulses to a function having exponential and power law components; and
   utilising said comparison as an indicator of the type of material detected by said apparatus.

3. An apparatus for detecting a metal or mineral object in a surrounding medium with a reduced sensitivity to external electromagnetic interference comprising:
   a transmission search coil for transmitting a magnetic field;
   a transmission apparatus for energising the transmission search coil with a substantially rectangular voltage producing a pulsed waveform;

a receive coil for detecting the changes in the surrounding magnetic field through a voltage induced across the receive coil by changes in the magnetic flux;

a measuring means for measuring the voltage across the receive coil at 3 or more selected time intervals after the end of a transmission pulse; and a processing means for processing said voltages such that a null summation is produced for a target medium by altering the time intervals and linearly combining the voltages across the receive coil at the time intervals to produce a ground balanced null signal substantially satisfying the following equations $$\Sigma k_i V_i = 0 \text{ and } \Sigma k_i = 0;$$

wherein $V_i$ is the voltage at the ith time interval after the end of the transmission pulse and $k_i$ is a multiplicative factor.

4. An apparatus for detecting a metal or mineral object in a surrounding medium comprising:

a transmission search coil for transmitting a magnetic field;

a transmission apparatus for energising the transmission search coil with a substantially rectangular voltage waveform producing a pulsed waveform that has pulses of two different, widths;

a receive coil for detecting the changes in the surrounding magnetic field through a voltage induced across the coil by changes in the magnetic flux a measuring means for measuring the voltage across the receive coil at a selected time interval after the end of a transmission pulse, the time interval being alterable;

a processing means of processing the said voltages, and altering the transmission pulse width, and altering the receive timing interval such that a null summation is produced for a target medium.

5. An apparatus as claimed in claim 4 wherein the null summation is produced by linearly combining the receive voltages determined after each pulse such that a ground balance null is substantially achieved according to the equation $$0 = V_{11} + kV_{12}$$

where $V_{11}$ is the voltage measured after the short transmission pulse and $V_{12}$ is the voltage measured after the long transmission pulse, and k is a multiplicative factor.

6. An apparatus for detecting a metal or mineral object in a surrounding medium with reduced sensitivity to ferromagnetic materials comprising:

a transmission search coil for transmitting a magnetic field;

a transmission apparatus for energising the transmission search coil with a substantially rectangular voltage waveform producing a pulsed waveform that has pulses of two different, widths;

a receive coil for detecting the changes in the surrounding magnetic field through a voltage induced across the receive coil by changes in the magnetic flux;

measuring means for measuring the voltage across the receive coil at two selected time intervals after the end of a transmission pulse, the time intervals being alterable;

processing means for processing the said voltages, altering the transmission pulse width, and altering the receive timing interval such that a null summation is substantially produced for a target medium.

7. An apparatus as claimed in claim 6 wherein the null summation is achieved by linearly combining the receive voltages derived from the short and long transmission pulses satisfying the following equation to produce a ground balanced null:

$$0 = \Sigma_{ij} k_{ij} V_{ij}$$

where $V_{i1}$ is the ith measurement interval after the end of the shorter transmission pulse, where $V_{i2}$ is the ith measurement interval after the end of the longer transmission pulse, and $k_{ij}$ is a multiplicative factor.

8. An apparatus for detecting a metal or mineral object in a surrounding medium with reduced sensitivity to ferromagnetic materials comprising:

a transmission coil for transmitting a magnetic field;

a transmission apparatus for energising the search coil with a substantially rectangular voltage producing a pulsed waveform that has pulses of at least three different, widths;

a receive coil for detecting the changes in the surrounding magnetic field through a voltage induced across the receive coil by changes in the magnetic flux;

measurement means for measuring the voltage across the receive coil at two selected time intervals after the end of a transmission pulse, the time intervals being alterable; and processing means for processing the said voltages, altering the transmission pulse width, and altering the receive timing interval such that a null summation is produced for a target medium.

9. An apparatus as claimed in claim 8 wherein the null summation is achieved by combining the voltages derived after each different transmission pulse width such that a ratio of values derived from the receive voltages due to any two of the transmission pulse width types are used to compute expected receive voltages due to the third transmission pulse type and are compared with measured voltages.

10. An apparatus as claimed in claim 3 wherein the null summation is achieved as follows:

given $t_i$ is the ith time interval after the transmission pulse, $V_{ij}$ is the ith measured voltage at time interval $t_i$ and after the jth transmission pulse type, calculating:

$$V_{11}/V_{21} = (t_1/t_2)^{-\alpha 1} \text{ and}$$

$$V_{12}/V_{22} = (t_1/t_2)^{-\alpha 2}$$

and $\alpha_i$ is the spectral index for transmission pulse type I, which depends on the material being interrogated, the null summation having little sensitivity to ferromagnetic materials being formed as follows:

$$0 = V_{13} + (t_1/t_2)^{-\alpha 3} V_{23}.$$

11. An apparatus for detecting a metal or mineral object in a surrounding medium with a reduced sensitivity to external electromagnetic interference comprising:

a transmission search coil for transmitting a magnetic field;

a transmission apparatus for energising the transmission search coil with a substantially rectangular voltage producing a pulsed waveform;

a receive coil for detecting the changes in the surrounding magnetic field through a voltage induced across the receive coil by changes in the magnetic flux;

a measuring means for measuring the voltage across the receive coil at 3 or more selected time intervals after the end of a transmission pulse; and a processing means for processing said voltages and altering the time intervals such that a null summation is produced for a target medium by comparing the measured voltages at given sample intervals to a power law and to an exponential law.

* * * * *